United States Patent
Fukumoto et al.

(10) Patent No.: US 11,319,738 B2
(45) Date of Patent: May 3, 2022

(54) UTILITY VEHICLE

(71) Applicant: KAWASAKI JUKOGYO KABUSHIKI KAISHA, Hyogo (JP)

(72) Inventors: Akihiro Fukumoto, Akashi (JP); Takashi Hisamura, Akashi (JP); Masato Kinoshita, Kakogawa (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 299 days.

(21) Appl. No.: 16/592,067

(22) Filed: Oct. 3, 2019

(65) Prior Publication Data

US 2021/0102418 A1    Apr. 8, 2021

(51) Int. Cl.
| | | |
|---|---|---|
| *E05D 7/04* | (2006.01) | |
| *B60J 5/04* | (2006.01) | |
| *E05D 3/02* | (2006.01) | |

(52) U.S. Cl.
CPC ............. *E05D 7/04* (2013.01); *B60J 5/0468* (2013.01); *B60J 5/0473* (2013.01); *E05D 3/02* (2013.01)

(58) Field of Classification Search
CPC ......... B60J 5/0468; B60J 5/0473; E05D 3/02; E05D 7/04
USPC .................................................... 296/146.11
See application file for complete search history.

(56) References Cited

U.S. PATENT DOCUMENTS

| | | | | |
|---|---|---|---|---|
| 4,765,025 A | * | 8/1988 | Salazar | E05D 7/105 16/261 |
| 5,564,775 A | * | 10/1996 | Ebert | B60J 5/0431 16/236 |
| 6,247,744 B1 | * | 6/2001 | Townsend | E05D 11/0027 16/388 |
| 7,988,210 B2 | * | 8/2011 | Shibata | E05B 85/045 292/340 |
| 2005/0140169 A1 | * | 6/2005 | Plavetich | E05D 11/0009 296/146.11 |
| 2011/0174424 A1 | * | 7/2011 | Briault | E05D 5/023 156/91 |
| 2016/0185192 A1 | | 6/2016 | Yamamoto et al. | |
| 2016/0332495 A1 | * | 11/2016 | Franker | B60G 3/20 |
| 2019/0211915 A1 | * | 7/2019 | Davis | B62D 21/18 |

FOREIGN PATENT DOCUMENTS

DE      102008027219 B3 *  7/2009  ............... E05D 3/12

* cited by examiner

*Primary Examiner* — Joseph D. Pape
*Assistant Examiner* — Veronica Marie Shull
(74) *Attorney, Agent, or Firm* — Wenderoth, Lind & Ponack, L.L.P.

(57) ABSTRACT

A utility vehicle includes a vehicle body frame, a hinge base attached to the vehicle body frame, a door provided to be openable and closable in a vehicle width direction with respect to the vehicle body frame, a hinge bracket attached to the door, and an intermediate bracket that is pivotably attached to the hinge base and to which the hinge bracket is attached. The hinge bracket is configured so that a position thereof with respect to the intermediate bracket can be adjusted, and thereby the door is configured to be adjustable in a vertical position.

7 Claims, 6 Drawing Sheets

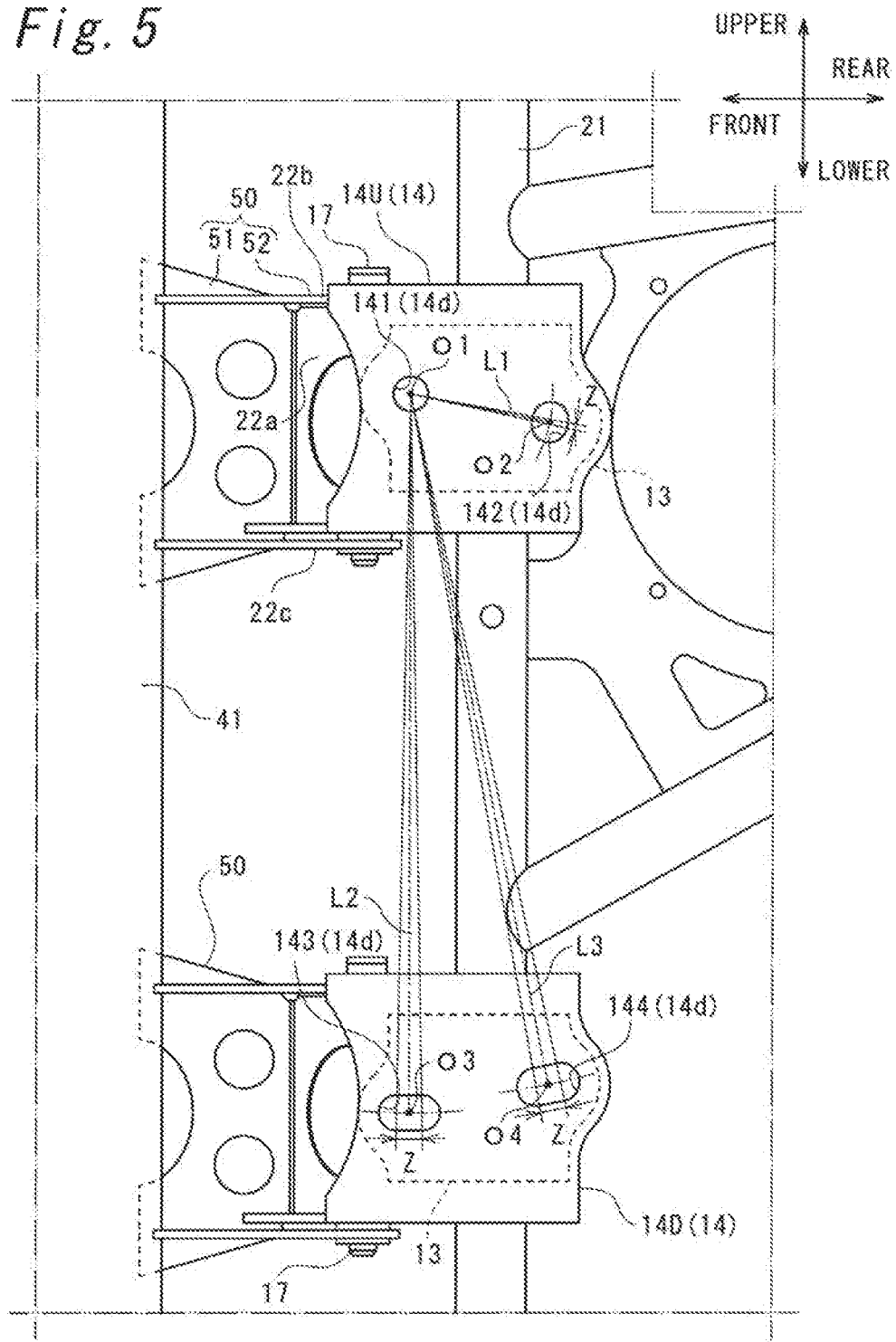

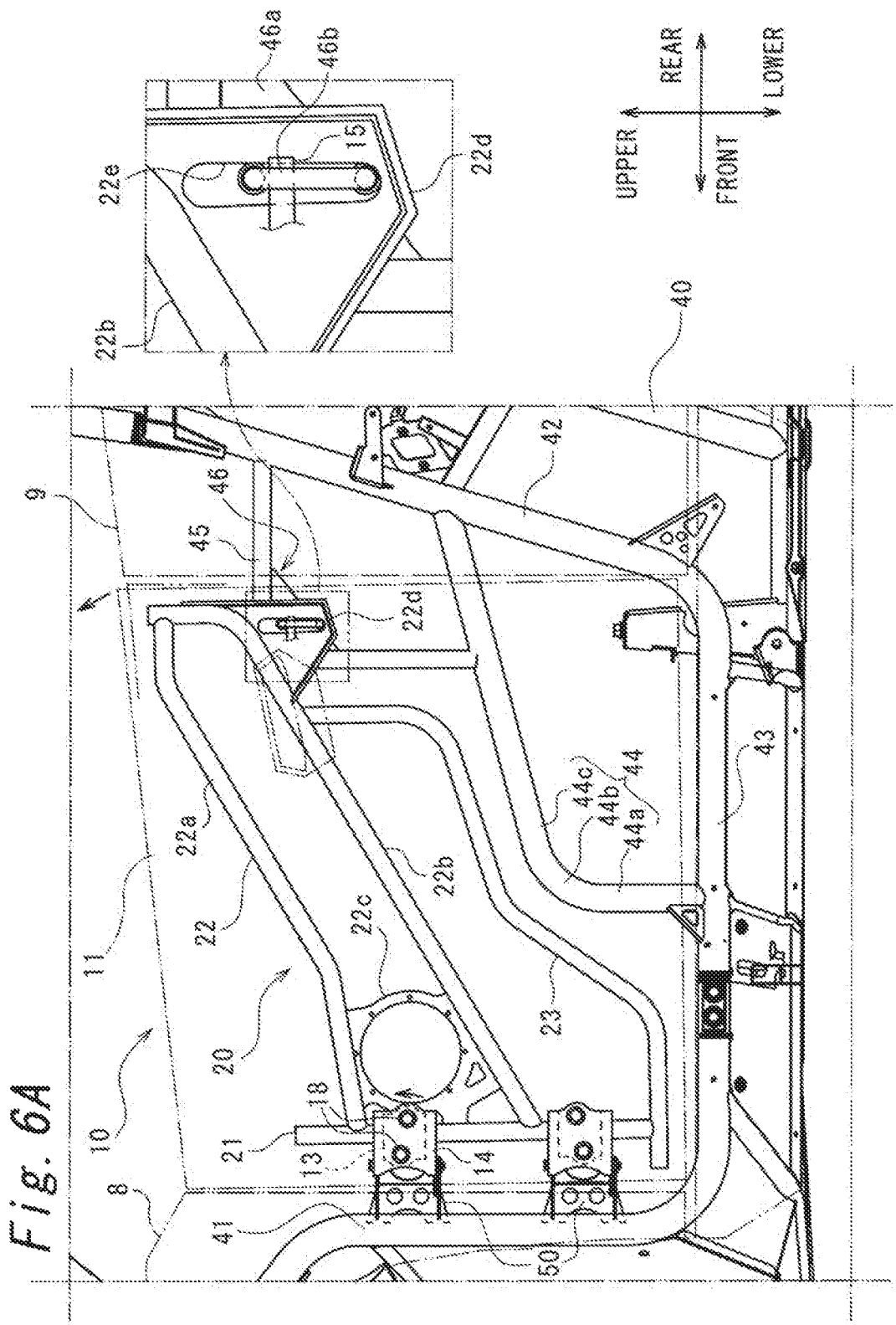

UTILITY VEHICLE

BACKGROUND OF THE INVENTION

Field of the Invention

The present invention relates to a utility vehicle.

Description of the Related Art

Some utility vehicles are known to have a door, as disclosed, for example, in US Patent Application Publication No. 2016/0185192.

The utility vehicle includes a vehicle body frame, a hinge base fixed to the vehicle body frame by welding, and a door supported so the hinge base so as to be openable and closable in a vehicle width direction. The door has a door frame and a hinge bracket fixed to the door frame by welding, and is pivotably connected to the hinge base with a pivot shaft extending in a vertical direction in the hinge bracket interposed therebetween.

Further, the utility vehicle includes, for example, a front fender, a door panel, and a rear fender as outer constituting members constituting an outer side surface of the utility vehicle. Generally, the front lender, the door panel, and the rear fender are designed so that the height positions in the vertical direction coincide with each other in a boundary portion of them so that their upper end portions (lower end portions) are continuous in a front-rear direction.

SUMMARY OF THE INVENTION

Here, while the front fender and the rear fender are attached to the vehicle body frame, the door panel is attached to the door frame. For this reason, variations in the attachment position of the door are likely to occur due to variations in the fixing position of the hinge base to the vehicle body frame, variations in the fixing position of the hinge bracket to the door frame, variations in the shape of each member, and the like. As a result, a vertical displacement occurs between the door panel and the front fender and the rear fender, and the utility vehicle may be deteriorated in appearance.

In particular, in a case where the hinge bracket is attached to the hinge base so as to rotate in the vertical direction as viewed from the side with respect to a normal attachment position at the front end of the door, variations are likely to become large in the vertical direction at the rear end of the door. In this case, the vertical positions of the door and a member (the rear fender in a case of a two-door vehicle, a rear door in a case of a four-door vehicle) located behind the door tend to be uneven.

In view of the above, an object of the present invention is to provide a utility vehicle that can suppress a difference in vertical position between a door and a member adjacent to the door.

In order to achieve the above object, according to an aspect of the present invention, there is provided a utility vehicle including: a vehicle body frame; a hinge base attached to the vehicle body frame; a door provided to be openable and closable in a vehicle width direction with respect to the vehicle body frame; a hinge bracket attached to the door; and an intermediate bracket that is pivotably attached to the hinge base and to which the hinge bracket is attached. The hinge bracket is configured so that a position thereof with respect to the intermediate bracket can be adjusted, thereby the door is configured to be adjustable in a vertical position.

According to the present invention, by adjusting the position of the hinge bracket with respect to the intermediate bracket, the vertical position of the door is adjustable, and the vertical positions of the door and members adjacent to the door at the front and the rear can be easily aligned. In this manner, a decrease in the appearance of the utility vehicle due to a difference in vertical position between the door and the members adjacent to the door is suppressed.

For example, the intermediate bracket may have a vertical wall portion on which the hinge bracket abuts and is fixed, and the hinge bracket may be configured so that a fixed position to the intermediate bracket is adjustable in a rotational direction on an abutting surface on which the hinge brackets abuts on the vertical wall portion.

According to this configuration, the position of the portion of the door located on the side opposite to the hinge bracket in the front-rear direction can be easily adjusted in the vertical direction. For example, in a case where the hinge bracket is provided in the front portion of the door, at the rear portion of the door where a difference in the vertical position from another adjacent member easily occurs, the vertical position of the door can be easily aligned with that of the member adjacent to the door at the rear.

For example, the intermediate bracket may be formed on the vertical wall portion with a plurality of fastening holes penetrating the vertical wall portion in a thickness direction thereof. The utility vehicle may further include a plurality of fastening members that are inserted through a plurality of the fastening holes and fix the hinge bracket to the intermediate bracket by fastening. The plurality of the fastening holes may include a first reference hole that has a constant radius and extends along a shaft portion of the fastening member, and a second long hole. The second long hole may extend in an arc direction having a radius that is a line segment connecting a center of the long hole and a center of the one reference hole.

According to this configuration, when the hinge bracket is attached to the intermediate bracket, the hinge bracket can be rotated with respect to the intermediate bracket within the range of the long hole around the reference hole and fixed by the fastening member.

For example, the vehicle body frame may further include a striker extending in a vertical direction, the door may have a lock device for locking the striker, and among a plurality of the fastening holes, a fastening hole which is closest to the lock device in a vertical direction may be the one reference hole.

According to this configuration, in a case where the hinge bracket is rotated and attached to the intermediate bracket, the lock device can be easily displaced in the vertical direction while the displacement in the front-rear direction is suppressed, so that the lock device can be easily engaged with the striker extending in the vertical direction.

For example, a plurality of the hinge brackets and the intermediate brackets may be provided in a vertically aligned manner. Among a plurality of the intermediate brackets, the intermediate bracket which is closest to the lock device in the vertical direction may be formed with the one reference hole and the other intermediate bracket may be formed with the long hole.

According to this configuration, in a case where a plurality of sets of the hinge bracket and the intermediate bracket are provided vertically, even if the hinge bracket is rotated and attached to the intermediate bracket, the lock device can be further easily displaced in the vertical direction while the displacement in the front-rear direction is suppressed, so that the lock device can be easily engaged with the striker extending in the vertical direction.

For example, a plurality of the hinge brackets and the intermediate brackets may be provided in a vertically aligned manner. Among a plurality of the intermediate brackets, the intermediate bracket located at an uppermost position may be formed with the one reference hole, and the other intermediate bracket may be formed with the long hole.

According to this configuration, in a case where a plurality of sets of the hinge bracket, and the intermediate bracket are provided vertically, even if the hinge bracket is rotated and attached to the intermediate bracket, the vertical position of the upper end of the door where the appearance is likely to be a problem can be easily adjusted while displacement in the front-rear direction is suppressed.

For example, in the intermediate bracket located at the uppermost position, a fastening hole that is highest in a vertical direction among a plurality of the fastening holes may be the one reference hole.

According to this configuration, even if the hinge bracket is rotated and attached to the intermediate bracket, the height position of the upper end of the door where the appearance is likely to be a problem can be further easily adjusted while displacement in the front-rear direction is suppressed.

BRIEF DESCRIPTION OF THE DRAWINGS

The foregoing and the other features of the present invention will become apparent from the following description and drawings of an illustrative embodiment of the invention in which:

FIG. 5 is a side view showing an area around the hinge bracket in an enlarged manner;

FIG. 6A is a diagram showing a state in which a rear upper end of the door is displaced uppermost.

DETAILED DESCRIPTION OF THE INVENTION

Hereinafter, an embodiment of the present invention will be described with reference to the accompanying drawings. Note that, for convenience of explanation, a front-rear direction of the utility vehicle will be referred to as a front-rear direction of a door and other parts, and, in a vehicle width direction, a left-right direction viewed from an occupant of the utility vehicle (left and right when viewing the front from the utility vehicle) will be referred to as a left-right direction of the door and other parts in the description below.

Figure 1:
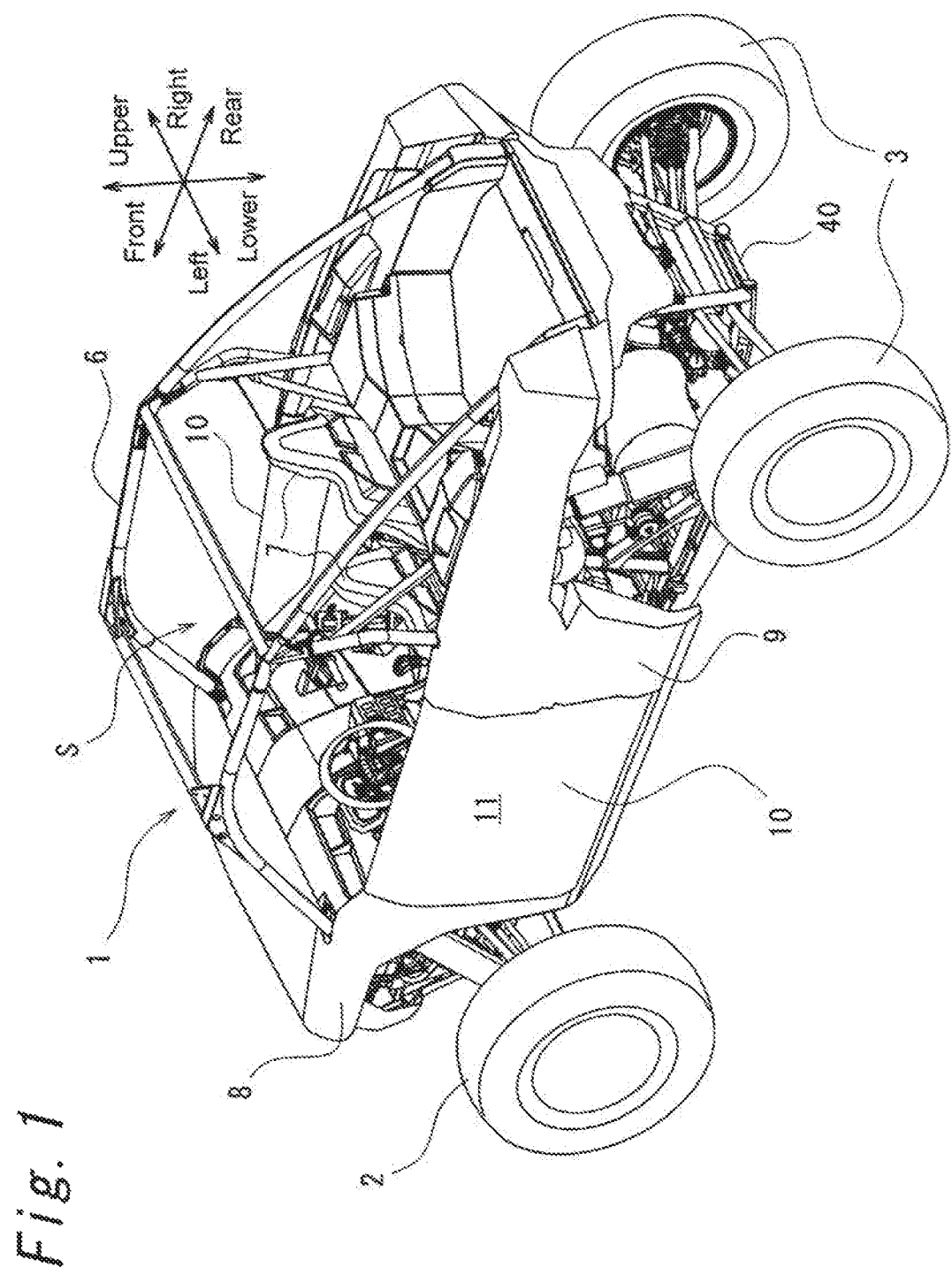
FIG. 1 is a perspective view of a utility vehicle according to an embodiment of the present invention.

FIG. 1 is a perspective view of a utility vehicle 1 according to an embodiment of the present invention as viewed from the rear. As shown in FIG. 1, the utility vehicle 1 includes a vehicle body frame 40 extending in the front-rear direction, a pair of left and right front wheels 2 disposed on both sides of the front end of the vehicle body frame 40, a pair of left and right rear wheels 3 disposed on both sides of the rear end of the vehicle body frame 40, and a ROPS 6 (Rollover Protective Structure) connected to an upper part of the vehicle body frame 40. In the utility vehicle 1, a riding space S surrounded by the ROPS 6 is formed between the front wheel 2 and the rear wheel 3.

In the riding space S, a pair of left and right front seats 7 are disposed. The utility vehicle 1 is configured as what is called a two-door vehicle having a pair of left and right doors 10 provided corresponding to a pair of the left and right front seats 7. The utility vehicle 1 is provided with a front fender 8 in front of the door 10 and a rear fender 9 behind the door 10.

The front fender 8 and the rear fender 9 are made from a resin material, and are outer members that constitute an outer surface of a vehicle side portion of the utility vehicle. The front fender 8 and the rear fender 9 are attached to the vehicle body frame 40. The front fender 8 covers an area around the front wheel 2 from above and from behind. The rear fender 9 covers an area around the rear wheel 3 from the front and from above.

Figure 2:
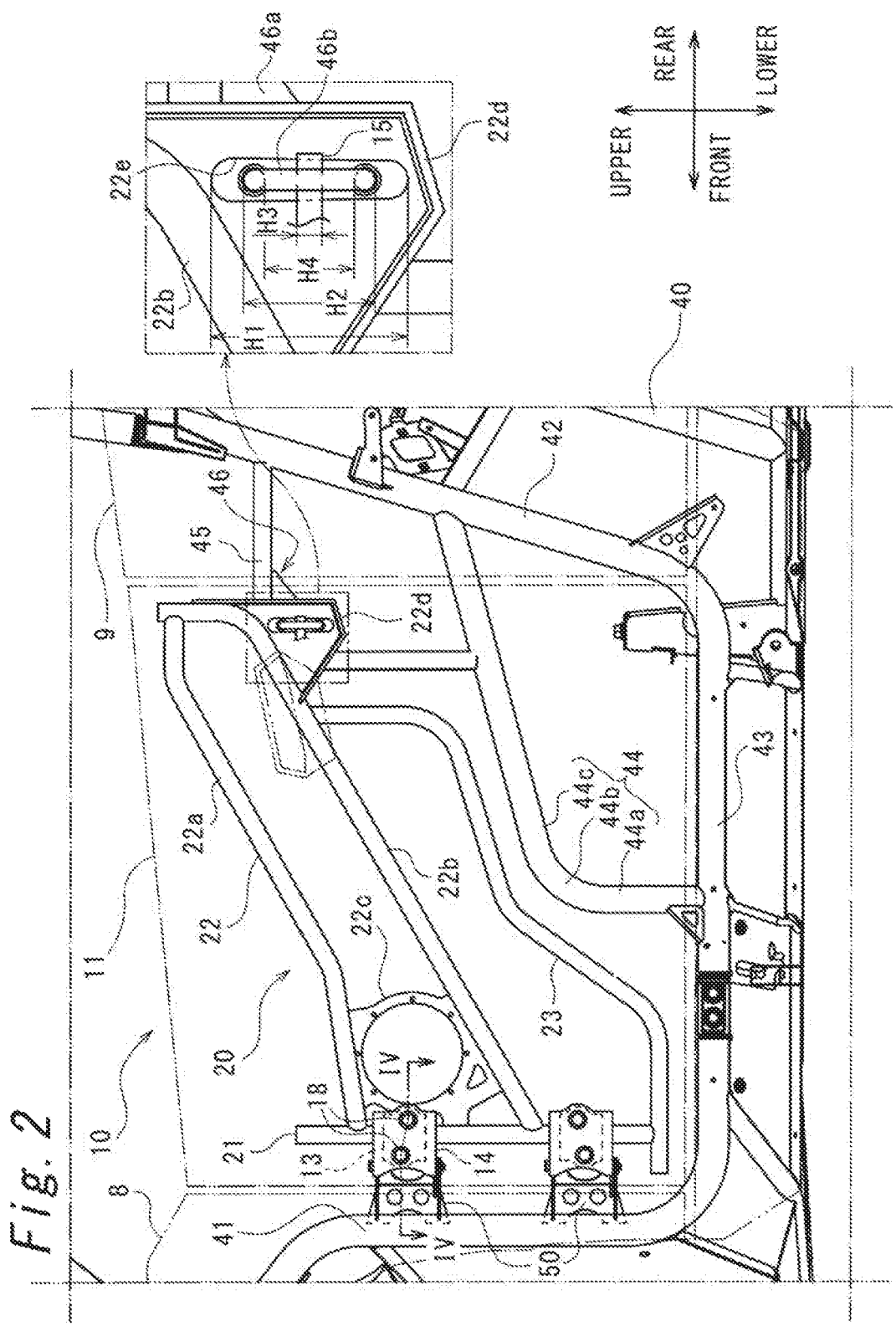
FIG. 2 is a side view of the utility vehicle showing an area around a door of FIG. 1 in an enlarged manner.

FIG. 2 is a left side view of the utility vehicle 1 showing an area around the door 10 on the left in an enlarged manner. In FIG. 2, outer members, such as the front fender 8, the rear fender 9, and a door panel 11 described later, in a transparent state are shown by a two-dot chain line. Further, FIG. 2 shows a state in which the door 10 is positioned at a normal attachment position in the vertical direction.

The vehicle body frame 40 includes a vehicle body front column 41 that extends vertically adjacent to the front side of the door 10, a vehicle body rear column 42 that is adjacent to the rear side of the door 10 and extends in an inclined direction where the upper side is closer to the rear side, and a front-rear frame 43 that connects lower ends of the vehicle body front column 41 and the vehicle body rear column 42 in the front-rear direction. The vehicle body front column 41 is provided with hinge bases 50 at two locations separated vertically that pivotally support the door 10 so that the door 10 can be opened and closed in the vehicle width direction.

Figure 3:
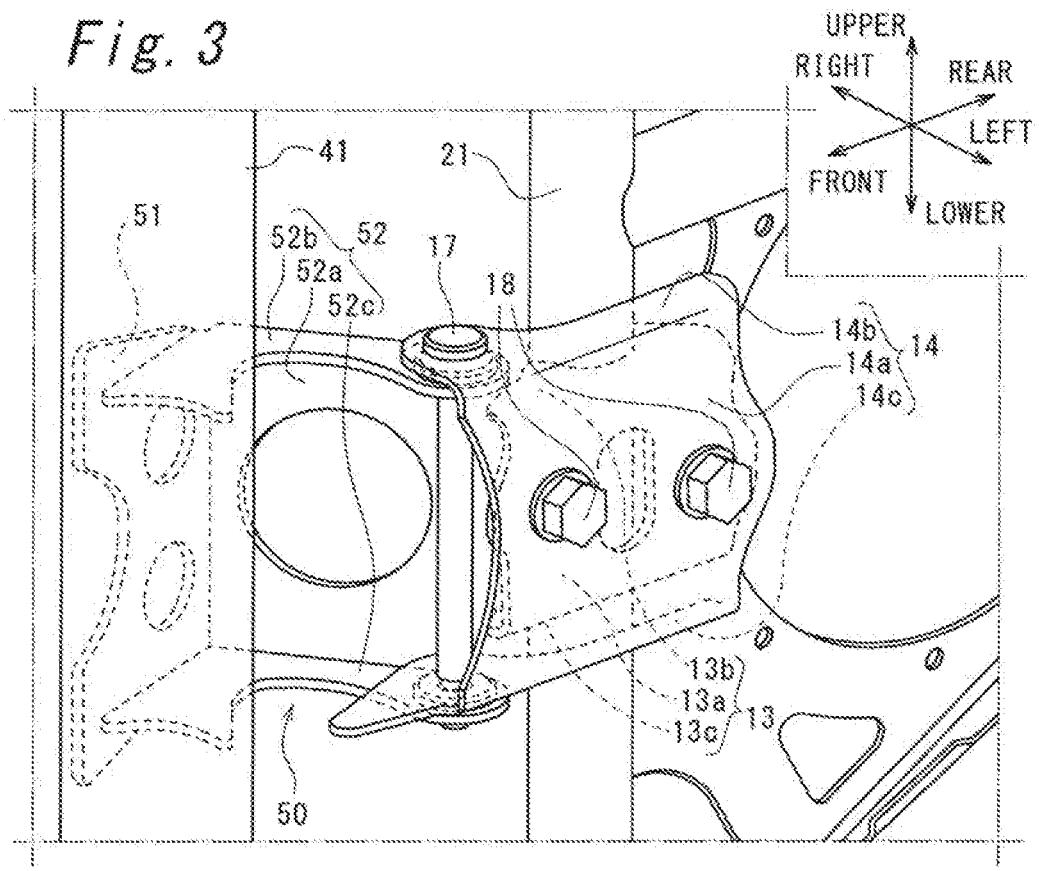
FIG. 3 is a perspective view showing an area around a hinge bracket.

FIG. 3 is a perspective view of an area around the hinge base 50 of FIG. 2 as viewed from the front. As shown in FIG. 3, the hinge base 50 includes a proximal end portion 51 joined to the vehicle body front column 41 by welding, and a door support portion 52 that extends outward in the vehicle width direction from the proximal end portion 51 and supports the door 10. The door support portion 52 includes a vertical wall portion 52a extending in the vertical direction, an upper flange 52b that is bent forward along an upper edge of the vertical wall portion 52a, and a lower flange 52c that is bent forward along a lower edge of the vertical wall portion 52a.

As shown in FIG. 2, the vehicle body frame 40 further includes a connection frame 44 that connects the front-rear frame 43 to the vehicle body rear column 42. The connection frame 44 includes a vertical portion 44a extending upward from a substantially middle position in the front-rear direction of the front-rear frame 43, a curved portion 44b that curves to the rear side from an upper end portion of the vertical portion 44a, and a front-rear portion 44c that extends from the curved portion 44b to the rear side and is connected to the vehicle body rear column 42.

Further, the vehicle body frame 40 also includes an auxiliary frame 45 that connects the connection frame 44 to the vehicle body rear column 42 above the front-rear portion 44c. The auxiliary frame 45 extends upward from an intermediate position in the front-rear direction of the front-rear portion 44c, bends to the rear side and extends to the rear side, and is connected to the vehicle body rear column 42 at the rear end.

The auxiliary frame 45 is provided with a locking part 46 that locks the door 10 at a closed position. The locking part 46 has a base plate 46a whose peripheral portion is attached to the auxiliary frame 45, and a striker 46b attached to a base plate 46a. The base plate 46a extends in parallel in the front-rear direction and the vertical direction. The striker 46b protrudes outward in the vehicle width direction from the base plate 46a, and is formed in a U-shape having an opening on an inner side in the vehicle width direction when viewed from the front.

The door 10 includes the door panel 11, a door frame 20, a hinge bracket 13, an intermediate bracket 14, and a lock device 15. The door panel 11 is made from a resin material, is an outer member that constitutes an outer surface of a vehicle side portion of the utility vehicle, and is attached to the door frame 20.

The door frame 20 is configured by connecting a plurality of pipe members by welding. The door frame 20 includes a door front column 21 extending in the vertical direction in a front portion of the door 10, a door main frame 22 that extends from the door front column 21 in a direction toward the rear side and inclined upward, and a door sub-frame 23 that connects a lower portion of the door main frame 22 and the door front column 21.

The door main frame 22 includes a first door main frame 22a that extends from the upper portion of the door front column 21 toward the rear side in an obliquely upward direction, and a second door main frame 22b that extends from the door front column 21 to the rear side in an obliquely upward direction below the first door main frame 22a. The rear end of the second door main frame 22b is curved and extends upward, and connected to the rear end of the first door main frame 22a.

The door main frame 22 further includes a speaker bracket 22c in the front portion. The speaker bracket 22c is connected to the first and second door main frames 22a and 22b and the door front column 21 at the peripheral portion thereof.

Further, the door main frame 22 further includes a striker fixing bracket 22d at the rear end. The striker fixing bracket 22d is provided at the rear end of the second door main frame 22b, and extends parallel to the vertical direction and the front-rear direction. The striker fixing bracket 22d has a striker insertion portion 22e penetrating in the vehicle width direction. The striker insertion portion 22e is formed at a position where the striker 46b is inserted in a state where the door 10 is closed.

The striker insertion portion 22e is formed to be elongated in the vertical direction along the striker 46b. Further, the striker fixing bracket 22d is provided with the lock device 15 which is configured to advance and retreat and engage with the striker 46b inserted through the striker insertion portion 22e.

Here, as will be described later, the door 10 according to the present embodiment is configured such that a height position in the vertical direction at an upper portion of the rear end can be adjusted within a range of ±5 mm. For this reason, the size and positions of the striker insertion portion 22e and the lock device 15 with respect to the striker 46b fixed to the vehicle body frame 40 are set in consideration of an adjustment margin of the door 10.

Specifically, in a state where the door 10 is positioned at the normal attachment position in the vertical direction, the striker insertion portion 22e is positioned corresponding to the center in the vertical direction of the striker 46b, and the lock device 15 is positioned corresponding to the center in the vertical direction of the striker 46b. A length H1 in the vertical direction of the striker insertion portion 22e is longer by 10 mm or more than a length H2 (also referred to as an outer width) in the vertical direction of the striker 46b. A length H3 in the vertical direction of the lock device 15 is shorter by 10 mm or more than a length H4 (also referred to as an inner width) in the vertical direction on an inner side of the U-shaped portion of the striker 46b.

As shown in FIG. 3, the hinge bracket 13 includes a vertical wall portion 13a extending in parallel in the front-rear direction and the vertical direction, an upper wall portion 13b extending inward in the vehicle width direction from an upper edge portion of the vertical wall portion 13a, and a lower wall portion 13c extending inward in the vehicle width direction from a lower edge portion of the vertical wall portion 13a.

Figure 4:
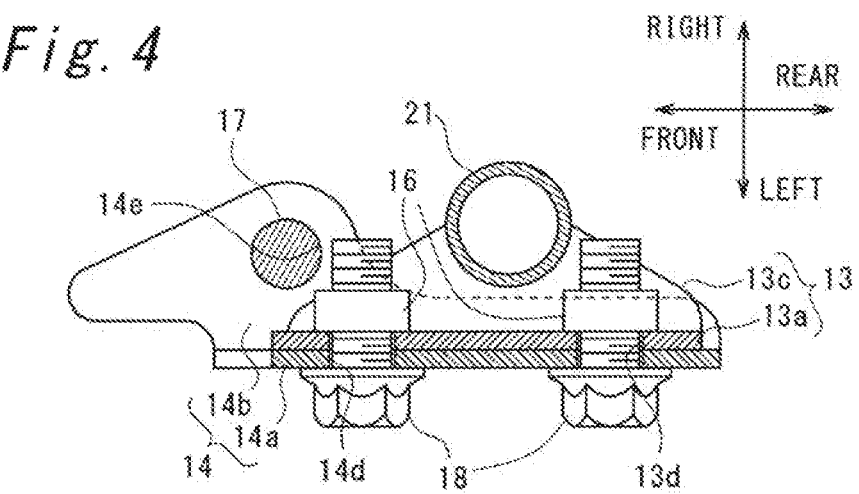
FIG. 4 is a cross-sectional view taken along line VI-VI in FIG. 2.

FIG. 4 is a cross-sectional view taken along line IV-IV in FIG. 2. As shown in FIG. 4, the hinge bracket 13 is formed on the vertical wall portion 13a with two fastening holes 13a penetrating the vertical wall portion 13a in the vehicle width direction (i.e. in a thickness direction thereof). On a flat surface on the inner side in the vehicle width direction of the vertical wall portion 13a, nuts 16 are joined by welding in a manner corresponding to two of the fastening holes 13d. The upper wall portion 13b and the lower wall portion 13c are joined to an outer peripheral portion of the door front column 21 by welding at a distal end portion.

As shown in FIG. 3, the intermediate bracket 14 includes a vertical wall portion 14a that extends in parallel in the front-rear direction and the vertical direction and abuts on the vertical wall portion 13a of the hinge bracket 13 from the outer side in the vehicle width direction, an upper wall portion 14b extending inward in the vehicle width direction from an upper edge portion of the vertical wall portion 14a, and a lower wall portion 14c extending inward in the vehicle width direction from a lower edge portion of the vertical wall portion 14a.

As shown in FIG. 4, the intermediate bracket 14 is formed on the vertical wall portion 14a with two fastening holes 14d penetrating the vertical wall portion 14a in the vehicle width direction (i.e. in a thickness direction thereof) at positions corresponding to two of the fastening holes 13d on the vertical wall portion 13a.

A pair of upper and lower through-holes 14e penetrating in the vertical direction are formed in front portions of the upper wall portion 14b and the lower wall portion 14c. As shown in FIG. 3, the intermediate bracket 14 is pivotably connected to the distal ends of the upper flange 52b and the lower flange 52c of the hinge base 50 by a pivot shaft 17 inserted through a pair of the upper and lower through-holes 14e.

The hinge bracket 13 is fixed to the intermediate bracket 14 by a fastening bolt 18 inserted from an outer side in the vehicle width direction and fastened to the nut 16 in a state where the vertical wall portion 13a of the hinge bracket 13 abuts on the vertical wall portion 14a of the intermediate bracket 14 from an inner side in the vehicle width direction in a state where the respective fastening holes 14d and 13d are made to correspond to each ether.

Therefore, by fixing the hinge bracket 13 to the intermediate bracket 14 pivotably supported around the pivot shaft 17 with respect to the hinge base 50, the door frame 20 joined to the hinge bracket 13 is supported so as to be rotatable in the vehicle width direction with respect to the hinge base 50. In this manner, the door 10 is supported so as to be operable and closable in the vehicle width direction with respect to the vehicle body frame 40.

Here, in the utility vehicle 1 according to the present embodiment, the fastening holes 14*d* of the intermediate bracket 14 are formed so that a position in the vertical direction of the upper rear end of the door 10 can be adjusted. A specific description will be made with reference to FIG. 5.

FIG. 5 shows an area around the hinge base 50, the intermediate bracket 14, and the hinge bracket 13 shown in FIG. 2 in an enlarged manner. Note that, in FIG. 5, the fastening bolt 18 is omitted. As shown in FIG. 5, the fastening holes 14*d* include first to fourth fastening holes 141 to 144. The first and second fastening holes 141 and 142 are formed on an upper intermediate bracket 14U. The third and fourth fastening holes 143 and 144 are formed on a lower intermediate bracket 14D.

In the upper intermediate bracket 14U, the first fastening hole 141 is formed on the front side close to the pivot shaft 17, and the second fastening hole 142 is formed on the rear side. The first fastening hole 141 is located above the second fastening hole 142. Referring also to FIG. 2, the first fastening hole 141 is positioned closest to the lock device 15 in the vertical direction among four of the fastening holes 141 to 144, more specifically, below the striker 46*b*.

In the lower intermediate bracket 14D, the third fastening hole 143 is formed on the front side close to the pivot shaft 11, and the fourth fastening hole 144 is formed on the rear side. The third fastening hole 143 is located below the fourth fastening hole 144.

Here, among the first to fourth fastening holes 141 to 144, the first fastening hole 141 whose position in the vertical direction is closest to the lock device 15 is formed as a round hole with a constant radius, while the other fastening holes 142 to 144 are formed as long holes. The first fastening hole 141 is formed with a minute margin (for example, 0.2 mm in diameter) with respect to a shaft portion of the fastening bolt 18, and is configured as a reference hole.

Specifically, when center points of the first to fourth fastening holes 141 to 144 are the center points O1, O2, O3, and O4, and line segments that connect the center point O1 and the center points O2 to O4 are line segments L1 to L3, the second to fourth fastening holes 142 to 144 are formed as long holes extending in the circumferential direction in a predetermined angle range Z, in which the line segments L1 to L3 are set to be radii with the center point O1 as the center.

Note that the center of the second to fourth fastening holes 142 to 144, which are long holes, means an intersection of the center line extending in the longitudinal direction and the center line extending in a shorter direction. In the present embodiment, the center line extending in the longitudinal direction extends on an arc.

Here, the predetermined angle range Z means an angle range between the hole center positions at both ends in the extending direction of the long hole with the center point O1 as the center. In other words, the second to fourth fastening holes 142 to 144 are formed as a track of a circle whose radius is constant (for example, a length obtained by adding 0.5 mm to the radius of the shaft portion of the fastening bolt 18) that are located at the center points O2 to O4 around the center point O1 is revolved over the predetermined angle range Z. In the present embodiment, the predetermined angle range Z is set to ±1 degree.

The second fastening hole 142 associated with the shortest line segment L1 has a shorter longitudinal length of the long hole than the third and fourth fastening holes 143, 144 associated with the line segments L2 and L3 which are relatively longer.

The adjustment in the height direction of the door 10 according to the embodiment described above will be described. First, the intermediate bracket 14 is pivotally supported on the hinge base 50 via the pivot shaft 17. Next, in a state where the vertical wall portion 13*a* of the hinge bracket 13 is made to abut on an inner side surface in the vehicle width direction of the vertical wall portion 14*a* of the intermediate bracket 14, positions of the fastening holes 13*d* and 14*d* are aligned in the front-rear direction and the vertical direction. Then, the fastening bolt 18 is temporarily fastened to the nut 16.

Figure 6B:
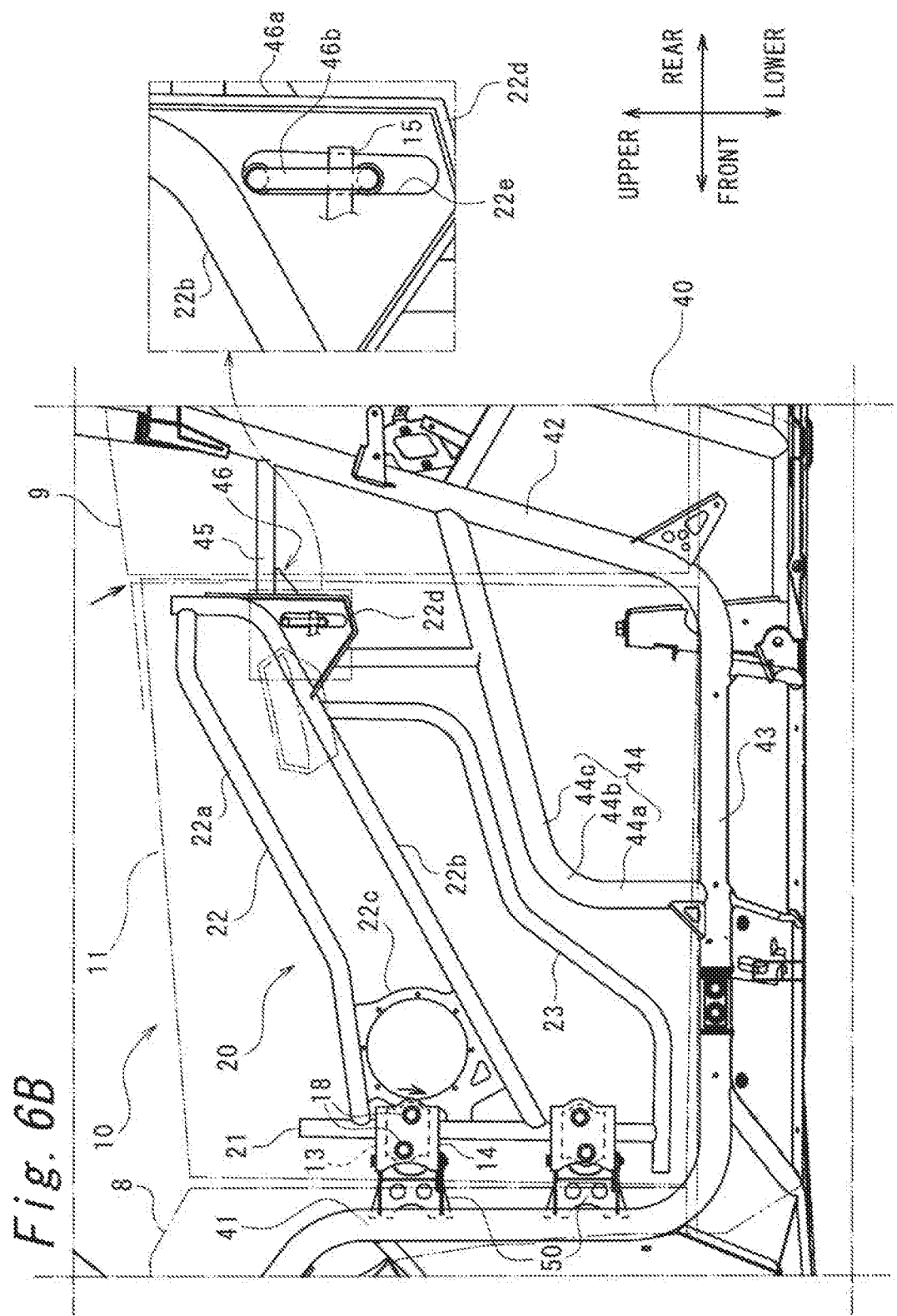
FIG. 6B is a diagram showing a state in which a rear upper end of the door is displaced lowermost.

In this state, the door 10 is rotated on a plane where the vertical wall portions 13*a* and 14*a* abut around the first fastening hole 141, so as to make an adjustment to match the vertical position of an upper rear end of the door panel 11 with the vertical, position of an upper front end of the rear fender 9. In the present embodiment, the second to fourth fastening holes 142 to 144 are configured as long holes corresponding to the predetermined angle range Z of ±1 degree. As a result, the upper rear end of the door panel 11 is movable within a range of around ±5 mm in the vertical direction. Note that FIG. 6A shows a state where the door 10 is rotated upward, and FIG. 6B shows a state where the door 10 is rotated downward.

The fastening bolts 18 are finally tightened in a state where the upper rear end of the door panel 11 matches with the upper portion of the rear fender 9. In this manner, the door panel 11 is continuously positioned in the front-rear direction with respect to the rear fender 9 in a state where the positions in the vertical direction are aligned.

Further, as described above, the length H1 in the vertical direction of the striker insertion portion is longer by 10 mm or more than the outer width H2 of the striker 46*b*, and the length H3 in the vertical length of the lock device 15 is shorter by 10 mm or more than the inner width H4 of the striker 46*b*. As a result, as shown in an enlarged manner in FIGS. 6A and 6B, even in a case where the door 10 (hinge bracket 13) is turned up and down with respect to the intermediate bracket 14, the striker 46*b* can be inserted through the striker insertion portion 22*e*, and the lock device 15 is configured to be able to lock the striker 46*b*.

The utility vehicle 1 according to the embodiment described above has the advantageous effects described below.

(1) By adjusting the position of the hinge bracket 13 with respect to the intermediate bracket 14, the vertical position at the upper rear end of the door 10 can be adjusted, and the vertical positions of the door 10 and the rear fender 9 adjacent to the rear side of the door 10 are easily aligned. In this manner, a decrease in the appearance of the utility vehicle 1 due to a difference in the vertical positions between the door 10 and the rear fender 9 is suppressed.

(2) By rotating the hinge bracket 13 relative to the intermediate bracket 14 on a surface abutting on the intermediate bracket 14, the position of the upper rear end of the door 10 can be easily adjusted in the vertical direction. In the present embodiment, the hinge bracket 13 is provided in the front portion of the door 10. Accordingly, at the upper rear end of the door 10 where a difference in vertical position from the rear fender 9 adjacent to the rear side of the door 10 easily occurs, the vertical position of the door 10 can be easily aligned with that of the rear fender 9 adjacent to the rear side of the door 10.

(3) The hinge bracket 13 can be rotated with respect to the intermediate bracket 14 around the first fastening hole 141 which is the reference hole within a range where the fastening hole 13*d* is positioned corresponding to the second to fourth fastening holes 142 to 144 which are the long holes of the intermediate bracket 14, and can be fastened by the fastening bolt 18.

(4) In the vertical direction, the hinge bracket 13 is rotated with respect to the intermediate bracket 14 using the first fastening hole 141 closest to the lock device 15 among the fastening holes 14*d* as a reference hole. In this manner, the lock device 15 can be easily displaced in the vertical direction while displacement in the front-rear direction is suppressed, so that, the lock device 15 can be easily engaged with the striker 46*b* extending in the vertical direction.

(5) Of the upper and lower intermediate brackets 14 provided in pairs, the first fastening hole 141 formed in the upper intermediate bracket 14U closer to the lock device 15 is configured as a reference hole. In this manner, the lock device 15 can be further easily displaced in the vertical direction while the displacement in the front-rear direction is suppressed, compared to a case where the third or fourth fastening holes 143, 144 formed in the lower intermediate bracket 14D is configured as a reference hole.

(6) Of the upper and lower intermediate brackets 14 provided in pairs, the first fastening hole 141 formed in the upper intermediate bracket 14U located above is configured as a reference hole. In this manner, the vertical position of the upper rear end of the door 10 where the appearance is likely to be a problem can be easily adjusted while displacement in the front-rear direction is suppressed, compared to a case where the third or fourth fastening holes 143, 144 formed in the lower intermediate bracket 14D is configured as a reference hole.

(7) Of the upper and lower intermediate brackets 14 provided in pairs, the first fastening hole 141 located above among the fastening holes 14*d* formed in the upper intermediate bracket 140 located above is configured as a reference hole. In this manner, the vertical position of the upper rear end of the door 10 where the appearance is likely to be a problem can be further easily adjusted while displacement in the front-rear direction is suppressed, compared to a case where the second fastening hole 142 located lower in the upper intermediate bracket 140 is configured as a reference hole.

The above embodiment, describes the case where the striker 46*b* and the lock device 15 are located above the fastening hole 14*d* as an example. However, the present invention is not limited to this. That is, the present invention may also be applied in a case where the striker 46*b* and the lock device 15 are located below one or more of a plurality of the fastening holes 14*d*. In this case, in the vertical direction, the fastening hole 14*a* closest to the lock device 15 is used as a reference hole, and the other fastening holes 14*d* are configured as long holes. In this manner, the lock device 15 can be easily displaced in the vertical direction while displacement in the front-back direction is suppressed, and the striker 46*b* can be easily locked by the lock device 15. On the other hand, by configuring the uppermost fastening hole 14*d* as a reference hole and the other fastening holes 14*d* as long holes, the upper rear end of the door 10 can be easily displaced in the vertical direction while displacement in the front-rear direction is suppressed.

The above embodiment describes the case where the pivot shaft is provided in the front portion of the door 10 and the rear portion is locked as an example. However, the present invention is not limited to this. That is, the present invention can be suitably applied to a case where a pivot shaft is provided in the rear portion of the door 10 and the front portion is locked. In this case, the vertical position of the upper front end of the door is easily adjusted, and is easily aligned with the vertical position of the front fender 8 located adjacent to the front side.

The above embodiment describes the case where the hinge bracket 13 is fixed to an inner side in the vehicle width direction of the intermediate bracket 14 as an example. However, the present invention is not limited to this. That is, the present invention can also be suitably applied to a case where the hinge bracket 13 is fixed to an outer side in the vehicle width direction of the intermediate bracket 14. In this case, the configuration may be such that, for example, the hinge bracket 13 is joined to an inner side in the vehicle width direction of the door front column 21, the nut 16 is fixed to an inner side in the vehicle width direction of the intermediate bracket 14 by welding, and further one of the fastening holes 13*d* of the hinge bracket 13 is used as a reference hole, and the other fastening holes 13*d* are configured as long holes.

In the above embodiment, the second to fourth fastening holes 142 to 144, which are long holes, are formed so that the center line in the longitudinal direction extends on the arc. However, the present invention is not limited to this. That is, the configuration may be such that the center line is orthogonal to the associated line segments L1 to L3 at the center points O2 to O4.

Various modifications and changes may be made without departing from the spirit and scope of the present invention as set forth in the claims.

What is claimed is:

1. A utility vehicle comprising:
a vehicle body frame;
a hinge base attached to the vehicle body frame;
a door provided to be openable and closable in a vehicle width direction with respect to the vehicle body frame;
a hinge bracket attached to the door; and
an intermediate bracket that is pivotably attached to the hinge base and to which the hinge bracket is attached,
wherein the hinge bracket is configured to be adjustable in position relative to the intermediate bracket so that a vertical position of the door is adjustable relative to the vehicle body frame.

2. The utility vehicle according to claim 1, wherein
the intermediate bracket has a vertical wall portion on which the hinge bracket abuts and is fixed, and
the hinge bracket is configured so that a fixed position to the intermediate bracket is adjustable in a rotational direction on an abutting surface on which the hinge bracket abuts on the vertical wall portion.

3. The utility vehicle according to claim 2, wherein
the intermediate bracket is formed on the vertical wall portion with a plurality of fastening holes penetrating the vertical wall portion in a thickness direction thereof,
the utility vehicle further includes a plurality of fastening members that are inserted through the plurality of fastening holes and fix the hinge bracket to the intermediate bracket by fastening,
the plurality of fastening holes include one reference hole that has a constant radius and is along a shaft portion of the fastening member, and the other long hole, and
the long hole extends in an arc direction having a radius that is a line segment connecting a center of the long hole and a center of the one reference hole.

4. The utility vehicle according to claim 3, wherein
the vehicle body frame further includes a striker extending in a vertical direction,
the door has a lock device for locking the striker, and
among the plurality of fastening holes, a fastening hole which is closest to the lock device in a vertical direction is the one reference hole.

5. The utility vehicle according to claim 4, wherein
a plurality of the hinge brackets and the intermediate brackets are provided in a vertically aligned manner, and
among the plurality of intermediate brackets, the intermediate bracket which is closest to the lock device in the vertical direction is formed with the one reference hole, and the other intermediate bracket is formed with the long hole.

6. The utility vehicle according to claim 3, wherein
a plurality of the hinge brackets and the intermediate brackets are provided in a vertically aligned manner, and
among the plurality of intermediate brackets, the intermediate bracket located at an uppermost position is formed with the one reference hole, and the other intermediate bracket is formed with the long hole.

7. The utility vehicle according to claim 6, wherein in the intermediate bracket located at the uppermost position, a fastening hole that is highest in a vertical direction among the plurality of fastening holes is the one reference hole.

* * * * *